United States Patent [19]

Bertand

[11] Patent Number: 4,699,943

[45] Date of Patent: Oct. 13, 1987

[54] SELF-EXTINGUISHING POLYSTYRENIC COMPOSITIONS

[75] Inventor: Jean-Noël M. Bertrand, Wezembeek-Oppem, Belgium

[73] Assignee: Labofina, S.A., Brussels, Belgium

[21] Appl. No.: 428,055

[22] Filed: Sep. 29, 1982

Related U.S. Application Data

[60] Division of Ser. No. 156,500, Jun. 4, 1980, Pat. No. 4,378,440, which is a continuation of Ser. No. 967,540, Dec. 7, 1978, abandoned.

[30] Foreign Application Priority Data

Dec. 9, 1977 [LU] Luxembourg ............................ 78663
Feb. 14, 1978 [DE] Fed. Rep. of Germany ....... 2806163
Apr. 18, 1978 [GB] United Kingdom ............... 15229/78

[51] Int. Cl.$^4$ .............................................. C08K 5/05
[52] U.S. Cl. ..................................... 324/380; 524/388
[58] Field of Search .................. 524/380, 388; 521/88, 521/117; 260/DIG. 24

[56] References Cited

U.S. PATENT DOCUMENTS

| | | | |
|---|---|---|---|
| 3,700,957 | 10/1972 | Daniels ................................. | 524/380 |
| 3,883,581 | 5/1975 | Davis et al. .......................... | 524/380 |
| 3,951,894 | 4/1976 | Whelan ................................ | 524/380 |
| 4,086,191 | 4/1978 | Hinselmann et al. ............... | 524/469 |

Primary Examiner—Veronica P. Hoke
Attorney, Agent, or Firm—John K. Abokhair; Cheairs: M. Norwood

[57] ABSTRACT

Disclosed are self-extinguishing polystyrenic compositions with improved thermal stability properties, comprising a styrenic resin and a fire-retardant agent which can either comprise solely a brominated pentaerythritol having at least one free-OH group or such a compound in combination with a peroxide.

5 Claims, No Drawings

SELF-EXTINGUISHING POLYSTYRENIC COMPOSITIONS

This is a division, of application Ser. No. 156,500, filed June 4, 1980, now U.S. Pat. No. 4,378,440 which in turn is a continuation of application Ser. No. 967,540 filed Dec. 7, 1978, now abandoned.

BACKGROUND OF THE INVENTION

The present invention relates to self-extinguishing polystyrenic compositions and to their preparation. More particularly, the invention relates to the improvememnt of the thermal stability properties of these compositions.

It is well known that styrenic resins, such as rubber reinforced polystyrene. acrylonitrile-butadiene-styrene resins, and polystyrene foams, may be rendered self-extinguishing by incorporating a halogenated organic compound therein. However, the action of this halogenated organic compound alone is generally not sufficient to make the styrenic resin fire-resistant, and a synergistic agent such as a peroxide or antimony trioxide is concomitantly used together with this halogenated organic compound.

In order to avoid the use of these synergistic agents, it has been suggested to use as fire-retardant agents, halogenated organic compounds which are less thermally stable. The advantage of these compounds resides in the fact that they are used alone and in lower amounts.

However, when styrenic resins containing such a type of fire-retardant agent are submitted to an injection molding process, wherein temperature generally varies from about 200° to 300° C., thermal decomposition of the fire-retardant agent occurs and this decomposition has a deleterious effect on the properties of the resin.

In order to overcome this drawback, thermal stabilizers are usually introduced into the composition. These stabilizers are generally compounds of barium, cadmium, lead or tin. However, these thermal stabilizers have a deleterious effect on the fire resistance. The only means to overcome this additional drawback is to increase the fire-retardant agent concentration in the composition, and hence the cost of the product.

SUMMARY OF THE INVENTION

It is therefore an object of the present invention to provide an improved fire-retardant polystyrenic resin composition.

Another object of the present invention is to provide a styrenic resin composition which is made fire-resistant by use of a halogenated organic compound which is thermally stable and which is used in the absence of any synergistic agent.

It is also an object of the present invention to provide fire-retardant polystyrenic resin compositions having improved molding properties, particularly thermal decomposition properties.

In accomplishing the foregoing objects according to the present invention there is provided a self-extinguishing polystyrenic composition consisting essentially of a styrenic resin and, as the fire-retardant agent, a brominated pentaerythritol containing at least one free-OH group.

The polystyrenic compositions of the present invention have an improved thermal stability and are suitable for injection molding at a temperature between about 200° C. and 300° C.

The styrenic resins which may be used in the present invention may be selected from polystyrene, rubber reinforced polystyrene, i.e., high impact polystyrene, acrylonitrile-butadiene-styrene resins (hereinafter referred to as ABS) and polystyrene foams. In the rubber reinforced polystyrene or in the ABS resins, the amount of rubber should generally not exceed about 6% by weight based on the entire composition. Such resins may be typically prepared by diluting a resing having a higher rubber content, either with crystal polystyrene or a styrene-acrylonitrile resin (hereinafter referred to as SAN), in order to lower their rubber content to less than 6% by weight. In ABS compositions, the amount of acrylonitrile or methacrylonitrile is generally between about 10 and 30% by weight based on the entire composition.

The brominated pentaerythritol which contains at least one free-OH group is a compound of the formula

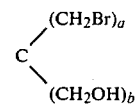

wherein a is 1, 2 or 3, and $a+b=4$. The brominated pentaerythritol thus may have from 1 to 3 bromine atoms; however, the dibrominated derivative is preferred. This derivative, which is also called dibromoneopenthylglycol, generally consists of a mixture of dibromoneopentylglycol, monobromopentaerythritol and tribromoneopentylglycol, the amount of dibromoneopentylglycol in this mixture being higher than about 80% by weight.

The preferred self-extinguishing polystyrenic composition of the invention contains at least about 1% by weight, based on total weight of the composition, of dibromoneopentylglycol. The self-extinguishing polystyrenic compositions are advantageously prepared by using a dibromoneopentylglycol in an amount of from about 2 to 5% by weight. Dibromoneopentylglycol amounts higher than about 8% by weight do not result in styrenic resins having good general properties.

When the styrenic resins used in the present invention are submitted to an injection molding process, at temperatures of from about 200° C. to 300° C., the sole fire retardant agent, such as dibromoneopentylglycol, is sufficient to ensure a good ignifugation together with a thermal stability higher than that obtained with the usual fire-retardant agents.

However, although their presence is not necessary, some thermal stabilizers may be added to the composition. Thermal stabilizers such as polyols and, particularly, pentaerythritol or dipentaerythritol may be used. However, the amount of these stabilizers should not exceed about 2% by weight and preferably not about 1% by weight based on the total weight of the composition.

On the other hand, if the styrenic resins are subjected to extrusion, there may be added to the composition, concomittantly with the fire-retardant agent, a synergistic agent of the peroxide type, because it is well known that extrusion temperatures are considerably lower than the temperatures required for an injection molding process. For example, extrusion temperatures typically range between about 180° C. and 230° C.

The advantage of introducing a synergistic agent of the peroxide type resides in the fact that it allows use of a considerably lower concentration of fire-retardant agent, such as dibromoneopentylglycol. Examples of suitable peroxides are dicumyl peroxide, bis($\alpha\alpha$-diethylbenzene) peroxide, bis($\alpha\alpha$-diisopropylbenzene) peroxide and cumyl hydroperoxide. The amount of peroxide which may be added should not exceed about 5% by weight, preferably not about 3% by weight, based on the total weight of the composition.

Further objects features and advantages of the present invention will become apparent from the detailed description of preferred embodiments which follows.

DETAILED DESCRIPTION OF PREFERRED EMBODIMENTS

The self-extinguishing polystyrenic compositions of the present invention must pass the vertical test of the Underwriters Laboratory in order to be classified as 94V2. This test consists in vertically suspending a sample of a thickness of from 6.35 to 1.60 mm at a distance of 0.95 cm above a burner giving a flame of 1.9 cm height. The sample is submitted to the flame twice during 10 seconds. In order to be classified as 94V2, the average extinction time of the sample must be lower than 25 seconds.

The compositions of self-extinguishing resins of the present invention are typically prepared by intimately blending the styrenic resin with fire-retardant agent, e.g., dibromoneopentylglycol. Generally, the intimate mixing is carried out in a kneader or in an extrusion device. However, the fire-retardant agent may also be introduced by dissolving it into the styrene monomer before polymerization. This latter method is used particularly for preparing fire resistant polystyrene foam compositions.

The following Examples illustrate the present invention without limiting same.

The dibromoneopentylglycol used in these Examples is a mixture containing 5 to 7% (by weight) monobromo-, 80 to 82% dibromo- and 13 to 15% tribromoneopentylglycol.

EXAMPLE 1

A composition of a styrenic resin is prepared by intimately blending in a kneader the following compounds:
crystal polystyrene: 47.85% by weight
polystyrene containing 6% rubber: 47.85% by weight
dibromoneopentylglycol: 4% by weight
dipentaerythritol: 0.2% by weight
2,6-di-tert-butylhydroxytoluene: 0.1% by weight This composition is classified as 94V2 according to the test of the Underwriters Laboratories, subject 94. Samples of this composition are injection molded up to a temperature of 250° C. without any decomposition. The time of the injection molding cycle is 43 seconds.

By way of comparison, compositions having the same concentration of different fire retardant agents are prepared. The fire retardant agents tested are those which are usually used alone.

The Table below gives the temperatures at which thermal decomposition occurs, and shows that none of the usual fire-retardant additives is stable during an injection molding at a temperature of 250° C.

| Additive | Thermal Decomposition Temperature |
| --- | --- |
| Hexabromocyclododecane | 230° C. |
| Pentabromochlorocyclohexane | 200° C. |
| Tetrabromododecandiol | 210° C. |
| Pentabromophenylallyl ether | 180° C. |
| Dibromoethyl-3,4-dibromocyclohexane | 220° C. |
| tris 2,3 dibromopropylphosphate | 230° C. |
| 2,3 dibromopropylether of tetrabromobisphenol A | 230° C. |
| 5,6-dibromo-1,10,11,12,13,13 hexachlorotricyclo(8,2,1,0$^{2,9}$) tridec-11-ene | 240° C. |

In another experiment, a similar composition is prepared, but with decabromodiphenyl ether which is a thermally stable fire retardant agent, but which is generally used with a synergistic agent.

With an amount of 4% by weight of decabromodiphenyl ether, the composition cannot be classified as 94V2 according to the test UL94.

EXAMPLE 2

A composition of a styrenic resin is prepared by blending the following compounds in an extrusion device.
crystal polystyrene: 47.95% by weight
polystyrene containing 6% rubber: 47.95% by weight
dibromoneopentylglycol: 4% by weight
2,6-di-tert-butylhydroxytoluene: 0.1% by weight This composition is classified as 94V2 according to the UL94 test. This composition is injection molded up to a temperature of 240° C. without any decomposition. The time of the injection molding cycle is 43 seconds.

By way of comparison, a similar composition is prepared, without any thermal stabilizer, and using 5,6-dibromo-hexachlorotridecene instead of dibromoneopentylglycol.

The composition is classified as 94V2, but the decomposition temperature is only 225° C.

EXAMPLE 3

Styrene monomer containing dibromoneopentylglycol dissolved therein is introduced into a reactor and is submitted to known polymerization conditions. The resulting polystyrene containing 4% by weight of dibromoneopentylglycol is thereafter expanded with pentane in an extrusion device. The resulting blocks are selfextinguishing.

The residence time in the extrusion device is 3 minutes at 220° C. No thermal degradation is observed.

EXAMPLE 4

A styrenic resin is prepared by blending the following compounds in a kneader.
crystal polystyrene: 46.85% by weight
polystyrene containing 6% rubber: 46.855 by weight
dibromoneopentylglycol: 2% by weight
cumyl hydroperoxide: 4% by weight
2,6-di-tert-butylhydroxytoluene: 0.1% by weight
pentaerythritol: 0.2% by weight This composition is classified as 94V2. It is extruded at a temperature of 220° C. with a residence time of 3 minutes. No thermal degradation is observed.

EXAMPLE 5

A composition of a styrenic resin is prepared by blending the following compounds in a kneader.

crystal polystyrene: 97.80% by weight
dibromoneopentylglycol: 2% by weight
2,6-di-tert-butylhydroxytoluene: 0.10% by weight
dipentaerythritol: 9.10% by weight This composition is classified as 94V2 according to the UL94 test. This composition is injection molded at a temperature of 250° C. No thermal degradation is observed.

EXAMPLE 6

A composition of a styrenic resin is prepared by blending the following compounds in a kneader.
polystyrene containing 6% rubber: 90.80% by weight
dibromoneopentylglycol: 8% by weight
dipentaerythritol: 1% by weight
2,6-di-tert-butylhydroxytoluene: 0.20% by weight This composition is injection molded at a temperature of 230° C. No thermal degradation is observed. This composition is classified as 94V2 according to the UL94 text.

EXAMPLE 7

A composition of a styrenic resin is prepared by blending the following compounds in a kneader.
SAN resin (having 15% acrylonitrile): 61.8% by weight
ABS resin (having 15% acrylonitrile and 6% rubber: 30.0% by weight
dibromoneopentylglycol: 8% by weight
dipentaerythritol: 0.2% by weight This composition is injection molded at a temperature of 220° C. No thermal degradation is observed. It is classified as 94V2 according to the UL94 test.

By way of comparison, a similar composition is prepared but using dibromoethyl-1,3,4-dibromocyclohexane instead of dibromoneopentylglycol. In order to avoid a thermal degradation, this composition must be injection molded at a temperature of 195° C.

EXAMPLE 8

A composition of styrenic resins is prepared by blending the following compounds in a kneader:
polystyrene containing 8% rubber: 25.00% by weight
crystal polystyrene: 69.70% by weight
dibromoneopentylglycol: 5.00% by weight
dipentaerythritol: 0.20% by weight
2,6-di-tert-butylhydroxytoluene: 0.10% by weight The average extinction time of this composition is 0.48 seconds.

Comparative compositions are also prepared in the same way:
polystyrene containing 8% rubber: 25.00% by weight
crystal polystyrene: 67.70% by weight
dibromoneopentylglycol: 5.00% by weight
dipentaerythritol: 0.20% by weight
2,6-di-tert-butylhydroxytoluene: 0.10% by weight
additive: 2.00% by weight The additive is, respectively:
$Sb_2O_3$: in composition A
$Fe_2O_3$: in composition B
$Fe_3O_4$: in composition C
Dicyclopentadienyl-iron in composition D The average extinction times are respectively:
with composition A: 7.58 seconds
with composition B: 11.9 seconds
with composition C: >60 seconds
with composition D: 31.8 seconds

EXAMPLE 9

A composition containing 95.90% (by weight) high-impact polystryene (rubber content: 2.4%), 4% tribromoneopentylglycol and 0.1% 2,6-di-tert-butylhydroxytoluene is injection molded up to a temperature of 240° C. without any decomposition. The average extinction time is 1.97 seconds.

What is claimed is:

1. A self-extinguishing polystyrenic composition with improved thermal stability properties comprising a styrenic resin selected from the group consisting of crystalline polystyrene, rubber-reinforced polystyrene, acrylonitrile-butadiene-styrene resins, and polystyrene foams having blended therewith a fire retardant agent consisting essentially of tribromopentaerythritol; the amount of tribromopentaerythritol constituting less than 8 percent by weight of said composition.

2. A polystyrenic composition according to claim 1, further including a thermal stabilizer comprising a polyol in an amount not exceeding about 2% by weight, based on the total weight of the composition.

3. A polystyrenic composition according to claim 2, wherein the polyol is selected from pentaerythritol and dipentaerythritol.

4. A polystyrenic composition according to claim 1, wherein the rubber content of the rubber reinforced polystyrene or acrylonitrile-butadiene-styrene resin does not exceed about 6% by weight.

5. A self-extinguishing polystyrene composition with improved thermal stability properties comprising a styrenic resin selected from the group consisting of crystalline polystyrene, rubber-reinforced polystyrene, acrylonitrile-butadiene-styrene resins and polystyrene foams having blended therewith a fire-retardant agent consisting essentially of a brominated pentaerythritol corresponding to the general formula $(OH-CH_2)_a$-C-$(CH_2Br)_b$ wherein a is 2 or 3 and $a+b=4$ and on an organic peroxide in an amount not exceeding about 5 percent by weight, based on the total weight of the composition.

* * * * *